United States Patent
Kim

(10) Patent No.: US 10,495,018 B2
(45) Date of Patent: Dec. 3, 2019

(54) METHOD FOR DEFINING LEARNING AREA OF INJECTOR OPENING DURATION CONTROL

(71) Applicant: HYUNDAI AUTRON CO., LTD., Seongnam-si (KR)

(72) Inventor: Yong-Ha Kim, Seongnam-si (KR)

(73) Assignee: Hyundai Autron Co., Ltd., Seoul (KR)

(*) Notice: Subject to any disclaimer, the term of this patent is extended or adjusted under 35 U.S.C. 154(b) by 0 days.

(21) Appl. No.: 15/836,886

(22) Filed: Dec. 10, 2017

(65) Prior Publication Data
US 2018/0163660 A1    Jun. 14, 2018

(30) Foreign Application Priority Data
Dec. 12, 2016   (KR) .......................... 10-2016-0168945

(51) Int. Cl.
F02D 7/00  (2006.01)
F02D 41/24  (2006.01)
F02D 41/22  (2006.01)

(52) U.S. Cl.
CPC ......... F02D 41/2445 (2013.01); F02D 41/22 (2013.01); F02D 41/221 (2013.01); F02D 41/247 (2013.01); F02D 41/2467 (2013.01); F02D 2041/227 (2013.01); F02D 2200/0602 (2013.01); Y02T 10/40 (2013.01)

(58) Field of Classification Search
CPC ..... F02D 1/00; F02D 1/04; F02D 1/08; F02D 41/144; F02D 2200/0406; F02D 2200/0408
USPC ......... 123/379, 382, 387, 390; 701/103–105, 701/114, 115
See application file for complete search history.

(56) References Cited

U.S. PATENT DOCUMENTS 3,971,348 A * 7/1976 Scofield .................. F02D 41/32
                                                        123/490
6,401,703 B1 * 6/2002 Mamiya ................ F02D 31/008
                                                        123/295

FOREIGN PATENT DOCUMENTS

| JP | 3782399 B | 4/2004 |
| JP | 2010-270739 A | 12/2010 |
| JP | 2011-052670 A | 3/2011 |
| JP | 2014-234923 A | 12/2014 |

* cited by examiner

Primary Examiner — John Kwon
(74) Attorney, Agent, or Firm — Baker & Hostetler LLP; Hyunho Park

(57) ABSTRACT

A method of determining a learning area of injector opening duration according to the present exemplary embodiment divides an entire control area for controlling opening duration of an injector into a learning map area which needs learning and a reference map area which uses an already prepared reference map as is without learning, and a period from a minimum injection time to a minimum linear injection time of the injector is determined as the learning map area, and a period from the minimum linear injection time to a maximum injection time is determined as the reference map area.

2 Claims, 3 Drawing Sheets

METHOD FOR DEFINING LEARNING AREA OF INJECTOR OPENING DURATION CONTROL

CROSS REFERENCE TO RELATED APPLICATION

The present application claims the benefit of Korean Patent Application No. 10-2016-0168945 filed in the Korean Intellectual Property Office on Dec. 12, 2016, the entire contents of which are incorporated herein by reference.

BACKGROUND OF THE EXEMPLARY EMBODIMENT

Field of the Exemplary Embodiment

The present exemplary embodiment relates to a method of determining a learning area of injector opening duration, and more specifically, to a method of determining a learning area of injector opening duration, which can reduce the time required for learning and memory load without greatly affecting preciseness of control by dividing an entire control area for controlling opening duration of an injector into a learning map area which needs learning and a reference map area which uses an already prepared reference map as is without learning.

Background of the Related Art

According to the related art, a fuel amount required by an engine is converted into a driving signal corresponding to the fuel amount on the basis of static flow of an injector in a specific situation. For example, the duration for opening the injector (driving time) is calculated by dividing the required fuel amount by the flow rate per hour of the injector determined on the basis of 100 bars.

However, since the driving time of an injector is not simply proportional to an opening amount of the injector in reality, there is a problem in that when the injector is controlled as described above, there is a case in which control of the fuel amount goes wrong although various correction maps are used.

To solve this problem, the inventor of the present exemplary embodiment has developed control logic that can further precisely control an amount of injection fuel by mapping the amount of injection fuel according to opening duration of an injector using a reference injector and controlling a required fuel amount using injector opening duration through a reference map and a learning map while the engine is actually running (Korean Patent Application No. 10-2015-0173470, currently unopened). That is, precise control of injector flow rate is realized by controlling the amount of injection fuel on the basis of opening duration of an injector, which has been controlled on the basis of flow rate per hour of the injector adopted in the related art.

However, when a value mapped using a reference injector is used, a control error may occur due to a difference between an injector actually installed in the engine and the reference injector. Although the error may be reduced through feedback control and learning control, a predetermined period of time is consumed inevitably.

In addition, when a learning map is created and used for individual injectors while the engine is actually running, if the number of points of to be learned increases, the learning time and memory load increase, and if the number of points decreases on the contrary, preciseness of the control is lowered unavoidably.

Accordingly, when accuracy of control is to be improved through a learning process by applying a reference map created using a reference injector to an injector actually installed in an engine, a new strategy is required to maintain the accuracy of control while reducing the time required for learning and the memory load.

SUMMARY OF THE EXEMPLARY EMBODIMENT

Therefore, the present exemplary embodiment has been made in view of the above problem, and it is an object of the present exemplary embodiment to provide a method of maintaining accuracy of control while reducing the time required for learning and memory load when the accuracy of control is to be improved through a learning process by applying a reference map of injector opening duration created using a reference injector to an injector actually installed in an engine.

To accomplish the above object, according to one aspect of the present exemplary embodiment, there is provided a method of determining a learning area of injector opening duration, which divides an entire control area for controlling opening duration of an injector into a learning map area which needs learning and a reference map area which uses an already prepared reference map as is without learning, and a period from a minimum injection time to a minimum linear injection time of the injector is determined as the learning map area, and a period from the minimum linear injection time to a maximum injection time is determined as the reference map area.

In addition, an area in which fuel pressure is between a minimum value of pump driving pressure and limp-home reference pressure may be determined as the reference map area regardless of injection time of the injector.

In addition, if a range in which the fuel pressure is between the limp-home reference pressure and maximum control target pressure is defined as a normal control pressure range, an overshoot area, in which the fuel pressure temporarily exceeds the normal control pressure range, may be determined as the reference map area in the learning map area determined as a period from the minimum injection time to the minimum linear injection time of the injector.

In addition, an abnormal high pressure area in which the fuel pressure exceeds the overshoot area may be determined as the reference map area regardless of injection time of the injector.

In addition, it may be preferable to maintain linearity of the control of the opening duration of the injector by matching a boundary value of the reference map area to a boundary value of the learning map area.

Meanwhile, a method of controlling injector opening duration according to the present exemplary embodiment includes the steps of: calculating opening duration of an injector corresponding to a required fuel amount; determining whether fuel pressure is in a normal control pressure range between limp-home reference pressure and maximum control target pressure; and controlling, when the fuel pressure is out of the normal control pressure range, the injector opening duration using a reference map of the opening duration of the injector.

In addition, the method of controlling injector opening duration further includes the step of determining whether an injection time is in a linear area or a nonlinear area when the fuel pressure is within the normal control pressure range, and if it is determined that the injection time is in a linear area, the opening duration of the injector is controlled using the reference map.

In addition, if it is determined that the injection time is in a nonlinear area, it is determined whether the fuel pressure is in an overshoot area, and the opening duration of the injector is controlled using the reference map if the fuel pressure is in the overshoot area, whereas the opening duration of the injector is controlled using a learning map if the fuel pressure is not in the overshoot area.

Figure 1:
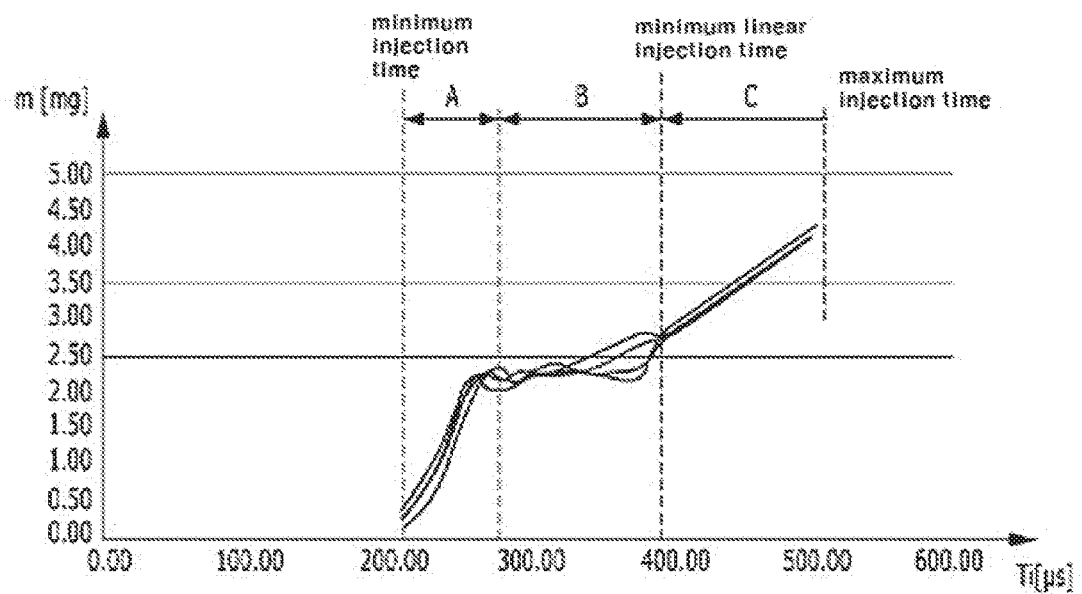
FIG. 1 is a view showing a relation between an amount of fuel injected by an injector and an operation time of the injector operating electrically.

DESCRIPTION OF SYMBOLS m: Amount of fuel injected by injector
Ti: Operation time of injector operating electrically
A: Ballistic section
B: Transient period
C: Non-ballistic section

DETAILED DESCRIPTION OF THE PREFERRED EMBODIMENT

The preferred embodiments of the exemplary embodiment will be hereafter described in detail, with reference to the accompanying drawings.

In describing the embodiments of the present exemplary embodiment, description of already known components that can be easily understood by those skilled in the art will be omitted not to obscure the spirit of the present exemplary embodiment. In addition, in assigning reference numerals to the components in the figures, the same reference numerals will be assigned to the same components wherever possible although they are shown in different figures, and it should be considered that when a figure is referred, the thickness of the lines and the sizes of the components shown in the figure may be shown to be exaggerated for the clarity and convenience of explanation.

In describing the components of the embodiments of the present exemplary embodiment, the terms such as 'first', 'second', 'A', 'B', '(a)', '(b)' and the like can be used. However, these terms are used only to distinguish one component from the other, and the spirit, order, sequence or the like of a corresponding component is not limited by the terms. It will be understood that when a component is referred to as being 'connected', 'coupled' or 'contacted' to other component, although the component may be directly connected or coupled to the other component, it may be indirectly 'connected', 'coupled' or 'contacted' to the other component with intervention of another component between the components.

Generally, an injector is configured in a structure provided with a valve at an end of a needle moved by electromagnetic force and injecting pressured fuel through an operation of the valve for opening and closing the injection outlet according to the movement of the needle.

FIG. 1 is a view showing a relation between an amount m of fuel injected by an injector and an operation time Ti of the injector operating electrically. In FIG. 1, the X-axis shows the operation time Ti expressed in the unit of microsecond μs, and the Y axis shows a fuel injection amount m expressed in the unit of milligram mg. Here, FIG. 1 shows profiles of relation between the fuel amount m and the operation time Ti obtained for a plurality of injectors.

Referring to FIG. 1, the profile of the amount m of fuel injected by the injector may be divided into several sections respectively showing a different pattern according to the operation time Ti of the injector operating electrically. These sections may be generally referred to as a ballistic section A, a transient section B and a non-ballistic section C.

The ballistic section A means a section in which the fuel amount m abruptly increases although the operation time Ti changes slightly. In addition, the transient section B appearing after the ballistic section A means a section in which change of the fuel amount m is not large although the operation time Ti changes greatly. As is known from FIG. 1, the ballistic section A and the transient section B are nonlinear sections.

Compared to this, after a predetermined operation time Ti is elapsed, a section showing a linear relation between the operation time Ti and the fuel amount m appears. This linear section is referred to as a non-ballistic section C.

Referring to FIG. 1, although the profile patterns of a plurality of injectors are irregular in the ballistic section A and the transient section B, which are non-linear sections, the profile patterns generally match each other in the non-ballistic section C, which is a linear section.

Figure 2:
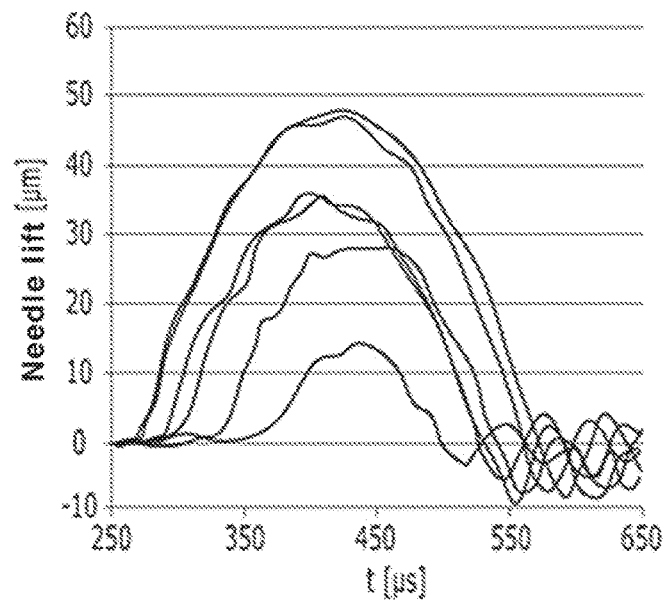
FIG. 2 is a view showing the deviation of opening amount in a nonlinear section, for the opening amounts of injection outlets of injectors respectively installed for each cylinder.

FIG. 2 is a view showing the deviation of opening amount in a ballistic section, for the opening amounts of injection outlets of injectors respectively installed for each cylinder. The X axis of FIG. 2 shows a time axis t expressed in the unit of microsecond μs, and the Y axis shows a lift amount of injector needles expressed in the unit of micrometer μm.

Referring to FIGS. 1 and 2 together, in the ballistic section A and the transient section B, although the time points of opening the injection outlets are the same and the same driving signal Ti is applied to the injectors, some injectors arrive at full-lift, whereas some injectors do not arrive at the full-lift (at the point of 400 μs). Accordingly, although the same driving signal Ti is applied, the opening durations of the injectors installed for each cylinder are different from each other. The deviation of the opening duration brings a difference in the amount of fuel injected into the combustion chamber.

Each of the injectors installed for each cylinder may be categorized into a minimum injector, a norminal injector and a maximum injector on the basis of the volume of the amount m of fuel injected by each injector when the same driving signal Ti is applied. Here, learning control may be performed to make the opening durations of all the injectors the same by correcting the driving signals Ti of the other injectors to output opening durations the same as the opening duration of a reference injector, after selecting a norminal injector as the reference injector and specifying and mapping the relation between the driving signal Ti and the opening duration of the reference injector.

Figure 3:
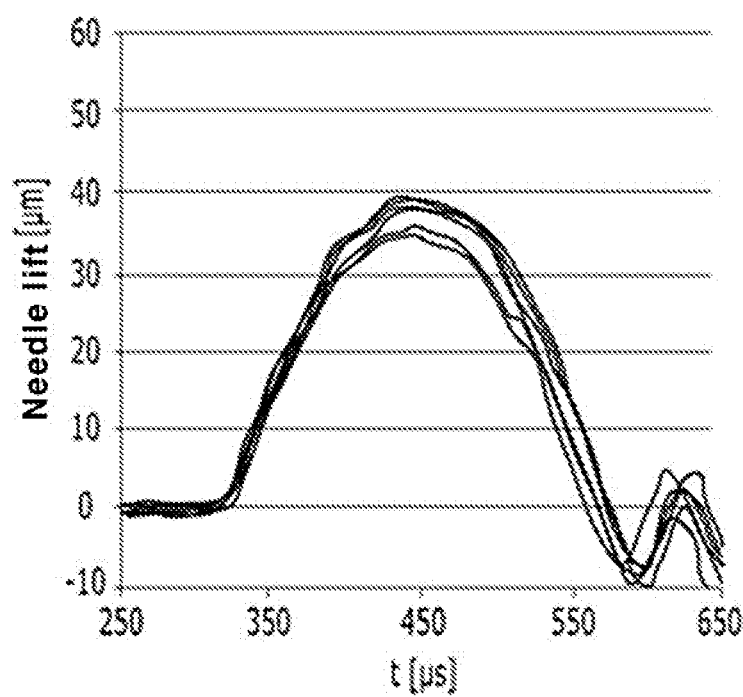
FIG. 3 is a view showing a result of learning the opening duration performed on each injector installed for each cylinder and compensating the deviation shown in FIG. 2 through a micro-precise control using a result of the learning.

FIG. 3 is a view showing a result of learning the opening duration performed on each injector installed for each cylinder and compensating the deviation shown in FIG. 2 through a micro-precise control using a result of the learning.

A further detailed description on the control of learning the injector opening duration may be referenced from Korean Patent Application No. 10-2015-0173470, which is a prior patent of the inventor.

Like this, compared with the conventional method of converting a fuel amount required by an engine into a driving signal corresponding to the fuel amount on the basis of static flow of an injector in a specific situation, preciseness of the control on the amount of injection fuel may be improved by mapping the amount of injection fuel according to the opening duration of the injector using a reference injector and controlling a fuel amount required for each injector using corrected injector opening duration through a reference map and a learning map while the engine is actually running.

However, although an error occurring due to the difference between the injector actually installed in the engine and the reference injector may be reduced through feedback control and learning control, a predetermined period of time is inevitably consumed until the learning is completed, and there is a tradeoff of increasing the learning time and the memory load if the number of points to be learned increases and unavoidably lowering preciseness of the control if the number of points decrease on the contrary.

The present exemplary embodiment has been conceived to effectively solve the problem of tradeoff in learning, and it is intended to reduce the learning period and the memory load by limiting the area which actually needs learning when the reference map of the injector opening duration is applied.

A method of dividing an entire control area into an area which needs learning (hereinafter, referred to as a 'learning map area') and an area using an already prepared reference map as is without learning (hereinafter, referred to as a 'reference map area') is as described below.

Two variables of injection time and fuel pressure are used as criteria for dividing a control area into a learning map area and a reference map area.

First, the injection time is a first criterion for dividing a control area into a learning map area and a reference map area.

As shown in FIGS. 1 and 2, the injection profile of an injector may be divided into a ballistic section A and a transient section B, which are nonlinear sections, and a non-ballistic section C, which is a linear section. That is, in the case of a plurality of injectors, deviation of the opening duration appears to be large in the nonlinear section, and there is almost no difference in the linear section.

Accordingly, if a period from the minimum injection time to the minimum linear injection time (i.e., a time point of starting the non-ballistic section) of the injector is determined as a learning map area and a period from the minimum linear injection time to the maximum injection time is determined as a reference map area, time and memory load needed for learning may be reduced greatly without seriously affecting preciseness of the control.

Here, the minimum injection time, the minimum linear injection time and the maximum injection time are values determined for the specification of each injector, and the minimum injection time may vary in the absolute time according to fuel pressure since the minimum injection time capable of injection increases as the fuel pressure increases.

Next, the learning map area may be reduced furthermore by adding the fuel pressure as a second criterion, in addition to the injection time.

Observing the low pressure area of the fuel pressure, there exists an area in which the fuel pressure is lower than or equal to a normal control pressure range. This is an area between a minimum value of pump driving pressure and limp-home reference pressure.

The limp-home reference pressure refers to fuel pressure of a limp-home mode for driving the engine with a minimum power to get into a service center, in addition to preventing a defect not to lead to a bigger failure, by reducing power of the engine greatly when a serious defect is sensed in the power system or the like of the engine and the transmission.

Since the limp-home mode is an emergency situation in which the engine may not run normally, it does not need to control to learn this case. Accordingly, if the fuel pressure is between the minimum value of the pump driving pressure and the limp-home reference pressure regardless of injection time, this may be determined as a reference map area without a problem.

Meanwhile, observing the high pressure area of the fuel pressure, an area in which the fuel pressure exceeds the normal control pressure range may be divided into two areas.

If a range between the limp-home reference pressure and maximum control target pressure is defined as a normal control pressure range, one is an overshoot area in which instantaneous pressure temporarily exceeds the maximum control target pressure while the injector is driven within the normal control pressure range.

The other is an abnormal high pressure area in which the fuel pressure temporary exceeds even the overshoot area.

Since the overshoot area is an area in which the pressure temporarily exceeds the normal control pressure range before the injection profile of the injector arrives at a linear section, its duration is very short, and the amount of fuel injected during the overshoot is insignificant. Accordingly, although the overshoot area set as a period from the minimum injection time to the minimum linear injection time (i.e., a time point of starting the non-ballistic section) in the learning map area is set as the reference map area without learning, the effect on the preciseness of injection control is very insignificant.

In addition, the abnormal high pressure area is an area in which abnormally high pressure is maintained at all times unlike the overshoot area. Since the abnormal high pressure area is not in a normal injection pressure state which needs inspection and repair of the injection system, this area may also be set as a reference map area without a problem regardless of injection time.

If the two variables of injection time and injection pressure are considered as described above, an area in which it is highly needed to practically perform a learning process on the reference map of the injector opening duration is reduced greatly, and if the learning map area is limited like this, the time required for learning and the memory burden can be reduced without damaging preciseness of the control of the injector flow rate.

Then, if a control area is divided into a reference map area and a learning map area, there may occur a difference in the value of the injector opening duration on the boundary of the areas as the learning is progressed. It needs to match the boundary values each other to maintain linearity of the control, and it is preferable to match the boundary value of the reference map area to the boundary value of the learning map area considering the learning effect.

Figure 4:
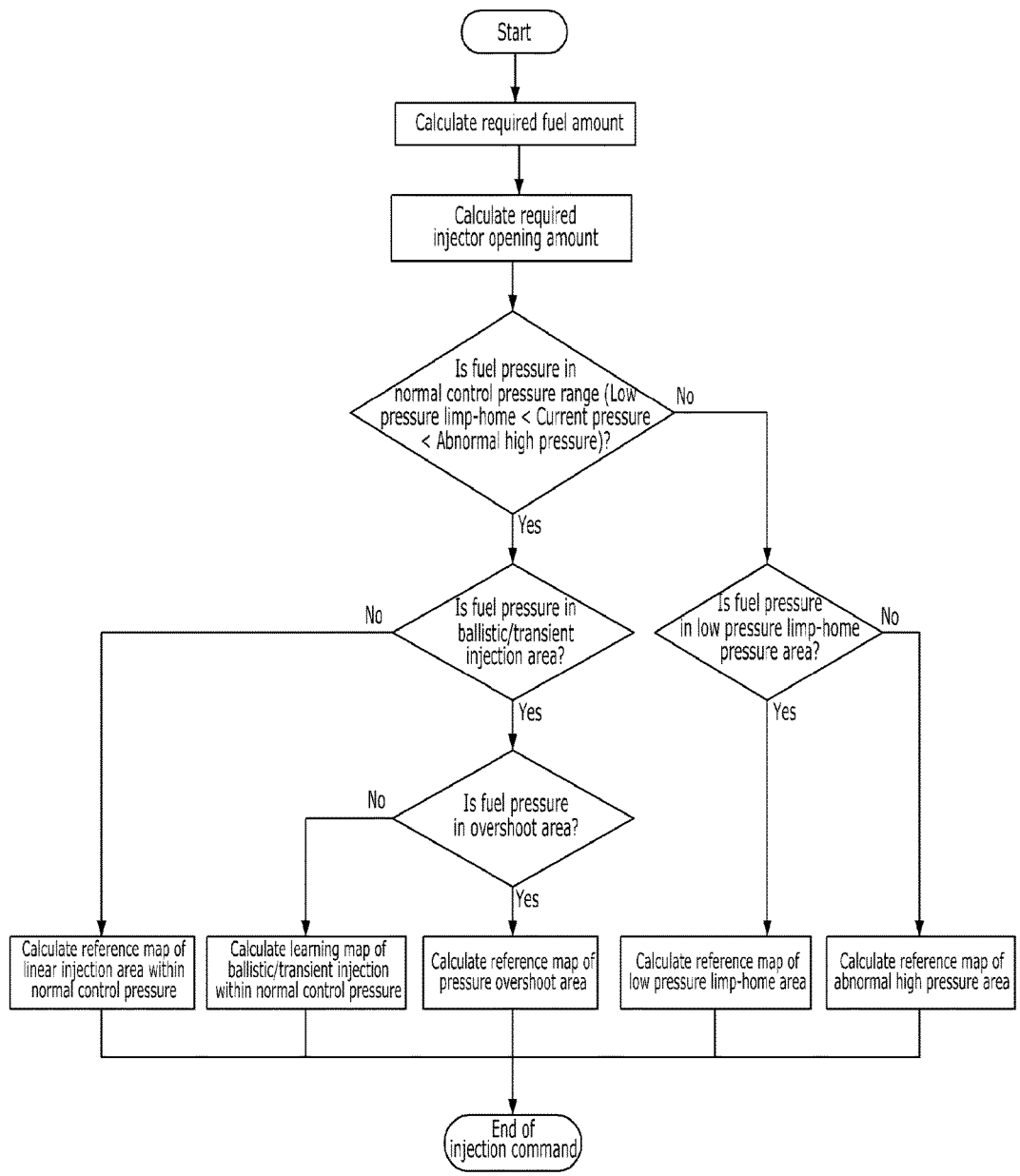
FIG. 4 is a view showing control logic applied when a control area of an injector is divided into a reference map area and a learning map area according to the present exemplary embodiment.

FIG. 4 is a flowchart illustrating a series of steps of controlling fuel injection of an injector according to the reference map area and the learning map area determined on the basis of the criteria described above.

Through the method as described above, the criteria for dividing a control area into a reference map area and a learning map area and an area that should be limited as a learning map area according to the criteria to effectively control the fuel injection considering the learning time and the memory load have become clear.

When the method of determining a learning area of injector opening duration is actually implemented as control logic in a vehicle, it needs to consider convenience of programming and efficiency of control.

Observing the article as described above, when fuel pressure is out of the normal control pressure range, which is a range between the limp-home reference pressure and the maximum control target pressure, it may be confirmed that the control area is determined as the reference map area at all times regardless of injection time.

Accordingly, if opening duration of an injector corresponding to a required fuel amount is calculated, determining first of all whether fuel pressure is within the normal control pressure range is advantageous from the aspect of convenience of programming and efficiency of control.

It is since that the time in which the fuel pressure is within the normal control pressure range occupies most of engine running time and, in comparison to this, an abnormal situation in which the fuel pressure is lower than or equal to the limp-home reference pressure or in an abnormal high pressure area is extremely rare.

If the fuel pressure is lower than or equal to the limp-home reference pressure or in an abnormal high pressure area, it only needs to immediately determine that the control area corresponds to the reference map area and control opening duration of the injector according to the reference map.

Then, if it is determined that the fuel pressure is within the normal control pressure range, whether the injection time is in a linear area or a nonlinear area is determined as a next step.

If the injection time is in a linear area, it may be immediately determined that the control area corresponds to the reference map area, and in this case, the opening duration of the injector is also controlled according to the reference map.

If the injection time is in a nonlinear area, whether the fuel pressure is in the overshoot area is determined once more, and if the fuel pressure is in the overshoot area, the control area is determined as the reference map area, and if the fuel pressure is not in the overshoot area, the control area corresponds to a ballistic or transient area, and thus a learning function needs to be performed only in this case since the control area corresponds to the learning map area.

If control logic is configured as described above, a case in which the fuel pressure is lower than or equal to the limp-home reference pressure or in an abnormal high pressure area, which occurs infrequently, may be preferentially excluded.

According to the method of determining a learning area of injector opening duration of the present exemplary embodiment having a configuration as described above, time required for learning and load of memory needed for using a learning map can be optimized by minimizing an area which needs learning by setting a predetermined area in which accuracy of control is not lowered significantly although a reference map is used as is.

Although preferred embodiments and embodied forms of the present exemplary embodiment have been shown and described above, it is to be appreciated that those skilled in the art may change or modify the embodiments without departing from the scope and spirit of the present exemplary embodiment. Accordingly, the scope of the present exemplary embodiment will be defined by the appended claims and their equivalents.

What is claimed is:

1. A method of determining a learning area of opening duration of a fuel injector of an automobile engine for controlling a fuel amount injected by the injector, the method comprising:
    determining the fuel amount to be injected by the injector;
    determining the opening duration of the injector to inject the determined fuel amount;
    dividing an entire control area for controlling the opening duration of the injector into a learning map area and a reference map area,
    wherein the learning map area is determined based on a period from a minimum injection time to a minimum linear injection time of the injector,
    wherein the reference map area is determined based on a period from the minimum linear injection time to a maximum injection time,
    wherein the learning map area requires learning of the opening duration of the injector and the reference map area uses a reference map,
    wherein the reference map area is further determined when fuel pressure is between a minimum value of pump driving pressure and limp-home reference pressure regardless of injection time of the injector;
    controlling the fuel amount based on the determined learning map area;
    determining a range of the fuel pressure as a normal control pressure range if the fuel pressure is between the limp-home reference pressure and maximum control target pressure;
    determining an overshoot area as the reference map area in the determined learning map area, wherein the overshoot area is determined when the fuel pressure temporarily exceeds the normal control pressure range; and
    determining an abnormal high pressure area as the reference map area regardless of the injection time of the injector, wherein the abnormal high pressure area is determined when the fuel pressure exceeds the overshoot area.

2. The method according to claim 1, wherein the method further comprises maintaining linearity of the control of the opening duration of the injector by matching a boundary value of the reference map area to a boundary value of the learning map area.

* * * * *